Dec. 4, 1962
G. W. BARNETT ETAL
3,066,562
CUTTING APPARATUS FOR NON-UNIFORM WEIGHT
PER UNIT LENGTH MATERIAL
Filed Nov. 13, 1957
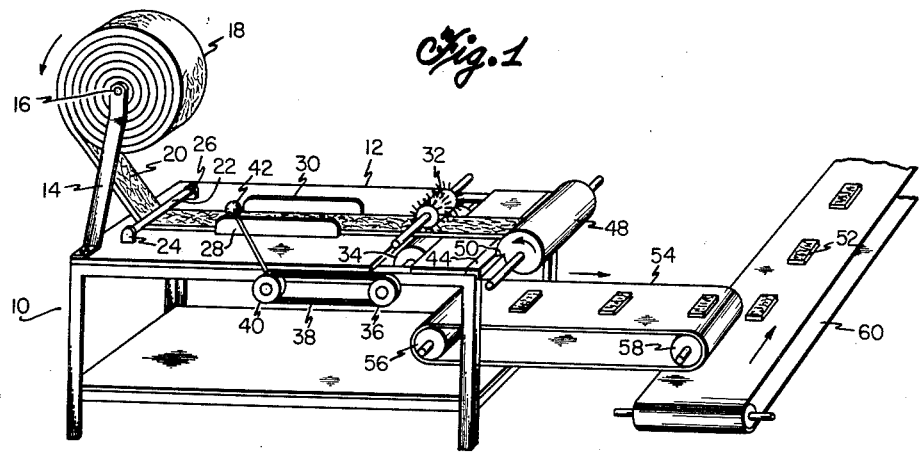
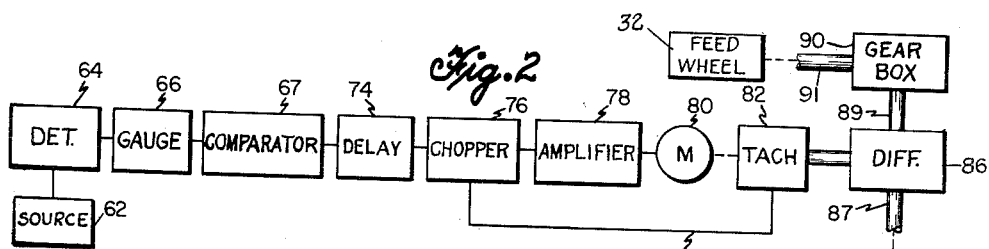
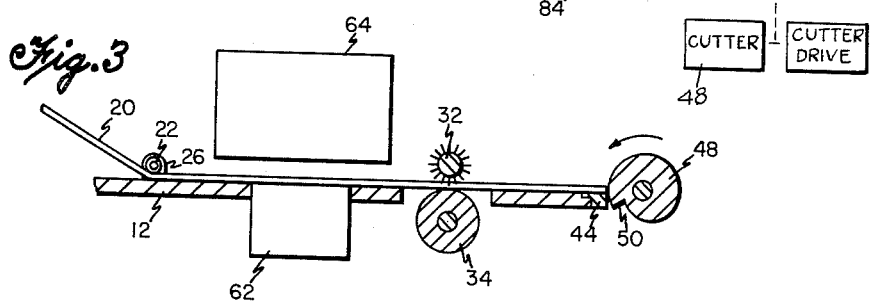
INVENTORS
Glenroy W. Barnett
Robert P. Einsel
BY Anthony D. Cennamo
ATTORNEY United States Patent Office 3,066,562
Patented Dec. 4, 1962

3,066,562
CUTTING APPARATUS FOR NON-UNIFORM
WEIGHT PER UNIT LENGTH MATERIAL
Glenroy W. Barnett and Robert P. Einsel, Columbus, Ohio, assignors to Industrial Nucleonics Corporation, a corporation of Ohio
Filed Nov. 13, 1957, Ser. No. 696,138
6 Claims. (Cl. 83—74)

This invention relates generally to controlling the quality of a product in a manufacturing process and more particularly to method and means of measuring and controlling the weight per unit area of a manufactured product.

For purposes of simplicity a preferred embodiment of the present invention is described in conjunction with a tampon manufacturing process. It will be appreciated, however, that the principles of the invention are equally adaptable to other manufacturing processes wherein the end product is obtained from a continuous flow of material.

In the manufacture of tampons a roll of cotton is mounted on a horizontal arbor and the cotton layer or "lap" is fed between a table top and serrated feed wheels. These wheels advance the lap under a rotary cutter which chops the lap into rectangular pieces or blanks. These blanks are then dropped onto a conveyor belt running below and at right angles to the direction of advance of the lap. In the tampon making machine the cutter feed is held constant and the cut length of the cotton lap is varied by changing the speed of the feed wheel. Even with equal sized blanks, however, weight variations in individual blanks are encountered and result in several disadvantages.

In order to avoid the production of tampons which do not meet minimum weight requirements for the particular absorbency grade involved, it is necessary to either reject all low weight blanks or to set the nominal mean weight so high that the mean low weight blanks will exceed the minimum weight standard. The first course of action is expensive in that the rejected blanks are either wasted or must be expensively reprocessed, while the second expedient uses a larger amount of cotton for any given number of tampons and thereby raises the cotton cost.

In accordance with the present invention pieces are produced in the usual manner by feeding the continuously moving material to a rotary cutter, however, immediately prior to the feed means a sensing unit is provided consisting of a source of radiation and a radiation detector. The apparatus is so mounted that radiation passes through the material as it moves toward the cutter. The detector produces a signal proportional to the weight per unit area of the material, which signal is fed to a gauging device, chopper and A.C. amplifier to produce an A.C. signal having a phase and amplitude proportional to the polarity and amplitude of the D.C. control signal produced by the detector.

It is accordingly a primary object of the present invention to provide method and means for measuring the weight per unit area of an elongated piece of material from a manufacturing process.

It is another object of the invention to provide a measuring and controlling system for minimizing the weight variations in individual units produced from a manufacturing process.

It is another object of the invention to provide apparatus for minimizing weight variation in the units produced in a manufacturing process that is simple in construction and readily adaptable to processes in use today.

These and further objects and advantages of the invention will become apparent upon reference to the following specification and claims and appended drawings wherein:

FIGURE 1 is a simplified perspective illustration of the cutting section of a manufacturing machine;

FIGURE 2 is a diagrammatic illustration of a control device for such machine according to one embodiment of the invention; and FIGURE 3 is a vertical section of a portion of the machine of FIGURE 1 showing the feed, cutting and sensing units.

Referring to FIGURE 1 there is shown a tampon machine consisting of a table 10 having a top 12 and having a pair of arms 14 supporting an arbor 16. A roll of cotton 18 is rotatably received upon the arbor 16 and is unwound downwardly at 20 to pass beneath a spindle 22 pivoted to table top 12 at 24 and 26. A pair of lap guides 28 and 30 are vertically mounted upon the table top 12 to guide the lap.

After passing through the guide plates 28 and 30, the lap passes beneath a plurality of toothed or serrated wheels 32 and over a wooden drive roll 34 located therebeneath. The serrated wheels 32 and the wooden drive roll 34 may be driven by means of a pulley 36, belt 38 and drive wheel 40. The effective diameter of the drive wheel 40 is controllable in a conventional manner by means of a control shaft 42. The source of motor power for driving wheel 40 is on the other side of the table and is not shown.

A metal knife edge 44 is provided at the end of table 12 and this cooperates with a roll 48 having a knife 50 attached thereto. The cutting roll 48 rotates in a counter-clockwise direction as shown in FIGURE 1 and cooperates with the knife edge 44 to sever the lap and to produce one blank 52 per rotation of the cutting roll 48. The cutting roll 48 is attached to a constant speed drive not shown. The blanks 52 severed from the lap crossing the table top 12 drop to a first conveyor 54 mounted on rollers 56 and 58 and from there are fed to a second conveyor 60 which carries the blanks 52 to the stitching operation in the tampon manufacture process.

According to the present invention a source of radiation 62 is mounted beneath table 12 and a radiation detector 64 is mounted above the table to detect radiations emanating from source 62 and passing through the lap 20 as shown in FIGURE 3. The source 62 may comprise an X-ray generator or a radioactive material. Artificial radioactive isotopes which emit one or more of the penetrative radiations including alpha rays, beta rays and gamma rays are satisfactory for this purpose and are preferably mounted in shielding collimating capsules. The detector may comprise any radiation sensitive device such as an ion chamber, Geiger-Müller tube, or scintillation counter. The source and detector are preferably elongated and extend the entire width of the lap to produce a control signal which is a function of the weight per unit length of the lap integrated over its entire width.

For a preferred embodiment utilizing one type of measuring and controlling system reference is made to FIGURE 2. The output of the detector 64 is fed to a gauge 66 which develops a D.C. signal proportional in amplitude and polarity to the magnitude and sense of the weight per unit length of the cotton. The signal which appears upon output lead of the gauge 66 is fed through a comparator unit 67 which compares the measured variable with a standard value. The resulting error signal is fed through a suitable delay unit 74 which delays the signal by an amount of time adequate to permit the sensed section of moving lap to reach the cutter before a speed change is effected. The delay circuit may be of the R-C type and may include some amplification. The nominal delay is equal to the distance from the cutting plane to the center of the area of radiation divided by the nominal process speed. That is to say, the delay time is equal to the time it takes for the lap to advance from the sensing area to the cutter. While such a fixed delay time does not compensate for corrective variations in process speed as a function of variations in weight per unit length of the lap, it has been found that the error introduced is so small as to be unobjectionable in most installations.

The output of delay unit 74 is fed to a conventional chopper 76 and A.C. amplifier 78 which produces an A.C. signal having a phase and amplitude proportional to the polarity and amplitude of the D.C. signal produced by the comparator. This signal is utilized to drive a servo motor 80 which may be of the usual two-phase type. Servo motor 80 provides one input to a mechanical differential 86. Local stabilization of the servo motor 80 may be effected by means of a voltage generating tachometer 82 which provides a feedback signal which is fed over lead 84 to chopper 76.

The second input 87 to mechanical differential 86 is provided by the constant speed drive which is conventionally used to drive the cutter roll 48. The output 89 of mechanical differential 86 represents the difference of the two inputs and is connected to a gear box 90 which has an output shaft 91 driving the serrated feed wheels 32. The speed of the constant speed drive for the cutter 48 should be substantially higher than the speed of motor 80 in order that the serrated feed wheels can accurately track the constant speed drive for any slight variations in its speed. By using this differential arrangement variations introduced by changes in speed of the constant speed unit driving the cutter are eliminated and an accurate vernier type control is achieved. Local stabilization of the motor unit may be secured where desired through the use of a tachometer 82 which produces a voltage fed back to the chopper 76 in a conventional manner.

With a control system of this nature it has been found possible to reduce the long term variations by approximately 80% and the intermediate term variations by approximately 50%. This reduction in intermediate and long term variations reduces the total standard deviation by approximately 60% and reduces the weight range of blanks being produced approximately 60%. Assuming the minimum weight blank in the uncontrolled system has a lower tolerance limit, this means that the nominal mean weight can be reduced approximately 5% with a savings in cotton cost of that amount. The control system makes it possible to secure either a more economical operation or an improvement in quality, or both. Maximum savings are achieved by setting the lower tolerance limit at the lowest weight found in the uncontrolled process, since this permits the greatest reduction in nominal mean weight. By establishing quality parameters above the lower tolerance limit it is possible to achieve both an improvement in product quality and a saving in cotton cost.

The present embodiment is to be considered in all respects as illustrative and not restrictive and the invention may be embodied in other specific forms without departing from the spirit or essential characteristics thereof.

What is claimed is:

1. In an apparatus for severing pieces from a continuous length of coherent material, said apparatus including a cutter, means for feeding said material to said cutter, drive means for said cutter and said feeder, and means for varying the speed of said feeder relative to the speed of said cutter, the improvement for providing pieces of uniform weight from material having a non-uniform weight per unit length, which comprises a radiation source and a radiation detector located on opposite sides of said material being fed to said cutter for providing a signal proportional to the weight per unit length of said material, and control means responsive to said signal for actuating said feeder speed varying means so as to alter the length of said pieces in inverse proportion to the weight per unit length of said material.

2. In an apparatus for severing pieces from a continuous length of coherent material, said apparatus including a cutter, means for feeding said material to said cutter, drive means for said cutter and said feeder, and means for varying the ratio of the speeds of said cutter and said feeder, the improvement for providing pieces of uniform weight from material having a non-uniform weight per unit length, which comprises a radiation source and a radiation detector located on opposite sides of said material being fed to said cutter for providing a signal proportional to the weight per unit length of said material, comparator means receiving said signal for providing an error signal of a magnitude and polarity in accordance with the deviation of the weight per unit length of said material from a desired value, means for maintaining a predetermined, constant speed of said cutter relative to the speed of said feeder in the absence of said error signal, and control means responsive to the appearance of said error signal for actuating said speed ratio varying means so as to alter the length of said pieces in inverse proportion to the weight per unit length of said material.

3. In an apparatus for severing pieces from a continuous length of coherent material, said apparatus including a cutter, means for feeding said material to said cutter, drive means for said cutter and said feeder, and means for varying the ratio of the speeds of said cutter and said feeler, the improvement for providing pieces of uniform weight from material having a non-uniform weight per unit length, which comprises a radiation source and a radiation detector located on opposite sides of said material being fed to said cutter for providing a signal proportional to the weight per unit length of said material, comparator means receiving said signal for providing an error signal of a magnitude and polarity in accordance with the deviation of said weight per unit length from a desired value, means receiving said error signal for providing an A.C. voltage of a magnitude and phase in accordance with the magnitude and polarity of said error signal, means for maintaining a predetermined, constant speed of said cutter relative to the speed of said feeder in the absence of said A.C. voltage, motor means responsive to the appearance of said A.C. voltage for actuating said speed ratio varying means so as to alter the length of said pieces in inverse proportion to the weight per unit length of said material.

4. The subcombination substantially as set forth in claim 3 in which said motor means comprises a two phase servomotor.

5. The subcombination substantially as set forth in claim 3 which further includes means for delaying said weight-functional signal for a time required for a discrete portion of said material to travel from said detector to said cutter.

6. The subcombination substantially as set forth in claim 3 which further includes a tachometer generator connected to said motor means for providing an electrical voltage, and means for connecting said electrical voltage in opposition to said error signal.

References Cited in the file of this patent

UNITED STATES PATENTS

| | | |
|---|---|---|
| 1,788,122 | Petersen | Jan. 6, 1931 |
| 2,529,161 | Kelling | Nov. 7, 1950 |
| 2,815,759 | Molins et al. | Dec. 10, 1957 |
| 2,830,811 | Paul | Apr. 15, 1958 |

FOREIGN PATENTS

| | | |
|---|---|---|
| 861,665 | Germany | Jan. 5, 1953 |